UNITED STATES PATENT OFFICE.

HEINRICH CARO, OF MANNHEIM, GERMANY, ASSIGNOR TO THE BADISCHE ANILIN AND SODA FABRIK, OF LUDWIGSHAFEN, GERMANY.

RHODAMIN DYE AND PROCESS OF MAKING SAME.

SPECIFICATION forming part of Letters Patent No. 625,641, dated May 23, 1899.

Application filed December 27, 1897. Serial No. 663,733. (Specimens.)

*To all whom it may concern:*

Be it known that I, HEINRICH CARO, doctor of philosophy, a subject of the King of Prussia, German Emperor, residing at Mannheim, in the Grand Duchy of Baden and Empire of Germany, have invented new and useful Improvements in the Manufacture of a Rhodamin Dye, (for which patents were obtained in Germany May 12, 1894, No. 81,042; in England August 20, 1894, No. 15,859, and in France July 21, 1894, No. 240,216,) of which the following is a specification.

My invention relates to the production of new red dyes of the rhodamin series suitable for dyeing unmordanted wool, and cotton mordanted with tannin, from chloral hydrate, chloral, or its alcoholic compounds generically included by the term "chloral body," and di-alkylated-meta-amido-phenol, especially di-ethyl and di-methyl-meta-amido-phenol.

If under ordinary conditions chloral hydrate and a di-alkyl-meta-amido-phenol be permitted to react upon each other, an energetic chemical reaction takes place, generally resulting in the formation of a complex mixture of blue, violet, and red coloring-matters and leuco compounds thereof, which it is difficult to separate into its ingredients and to purify the latter. What I have now discovered is that if suitable conditions be chosen a series of four reactions take place, the one after the other, and which constitute a new and elegant process, resulting, finally, in the formation of new red rhodamin dyes in an uniform condition unmixed with other products. The following are the reactions or stages of this process:

First: Equimolecular proportions of the di-alkyl-meta-amido-phenol chosen and of chloral hydrate combine with one another on admixture without the application of heat. One (1) molecular proportion of water is split off. The product is in each case a colorless base, which is insoluble in water and but slightly soluble in benzene and is readily soluble in alcohol, acetone, and chloroform, and can be easily obtained in crystalline form or crystals from these solvents.

Second: One (1) molecular proportion of the intermediate product obtained in the manner just described is heated under suitable conditions, as hereinafter set forth, with one (1) molecular proportion of a di-alkyl-meta-amido-phenol. The di-alkyl-meta-amido-phenol taken may be the same as or it may be different from the di-alkyl-meta-amido-phenol used in the preparation of the intermediate product above described. In the first case the rhodamin eventually obtained is a symmetrical tetra-alkylated rhodamin. In the second case it is an unsymmetrical tetra-alkylated rhodamin, and this latter belongs to a class of rhodamins which prior to this invention were practically unobtainable.

If it be desired to produce symmetrical rhodamins, the first two stages of the reaction can be readily effected together. (See Example I, hereinafter described.) The product obtained at the end of this stage of the process contains in each case a new leuco base or a salt thereof which readily oxidizes to a new blue coloring-matter.

Third: The leuco bases are oxidized to their corresponding blue or greenish-blue coloring-matters. This goes on spontaneously if the free base be exposed to the action of the air, and especially if the atmosphere be ammoniacal; but I prefer to obtain these blue coloring-matters by treating the solutions of the salts of their leuco bodies with oxidizing agents—such as ferric chlorid, chromic acid, peroxids, iodin, and the like.

Fourth: If an aqueous solution of one of the blue coloring-matters be left to itself, it changes slowly in the cold, but rapidly on heating, into the corresponding aforesaid red rhodamin dyes.

The following examples will serve to further illustrate my invention, and they show the way in which I prefer to perform the operation. The parts are by weight.

*Example I. Production of a symmetrically-constituted red rhodamin dye.*—Grind together about one (1) part of powdered chloral hydrate and three (3) parts of powdered di-ethyl-amido-phenol. The mixture shortly assumes a slight blue violet color, cakes together, and tends to become liquid. Finally it solidifies to a nearly-colorless mass. Allow to stand for about an hour. The first stage is now ended, and this mass practically consists of the new intermediate product hereinbefore mentioned, with the excess of unchanged di-ethyl-amido-phenol. Without isolating any of these bodies reduce the mass to powder and spread the material out in a thin layer on plates or dishes and heat in a drying-chamber or similar apparatus by gradually and slowly raising the temperature during about twelve (12) hours from forty (40) to finally seventy (70) degrees centigrade. During this heating the mixture melts together and assumes a bluish-violet color; but finally it solidifies and at the surface takes on a blue or greenish-blue color. The second stage is now ended, and the product thereof is a brittle and glassy substance which contains the new leuco base of the blue coloring-matter. Reduce the product of the second stage of the process to a fine powder and suspend it in fifty (50) times its weight of cold water. The leuco base separates out in white flocks which soon become bluish. Dissolve this by carefully adding dilute acid. Thoroughly stir the solution and run in a dilute solution of ferric chlorid (containing, say, about five per cent. (5%) of $FeCl_3$.) The mixture becomes intensely green-blue. The third stage of the process—that is, the oxidation of the leuco base—is complete when no further formation of color takes place on addition of a further quantity of ferric chlorid. To determine this point, take test portions of the mixture from time to time, and precipitate the blue dye with common salt, then filter and add a drop of ferric chlorid solution to the filtered liquor. It will then be easy to see if further formation of color occurs or if the operation be ended. During this third stage of the operation it is desirable to protect the blue coloring-matter from the further action of the oxidizing agent and also to prevent its premature conversion into the aforesaid red rhodamin dye. For this purpose add a precipitant to the solution, so as to precipitate the coloring-matter from the solution as it is formed. By employing common salt as a precipitant it separates out as a hydrochlorid in the form of a semiliquid tarry mass with a coppery luster and is separated from the mother-liquor by decantation. If a nitrate be used as precipitant and be added to the solution at the beginning of the third stage, then the blue coloring-matter separates out as a nitrate in the form of green crystals with a metallic luster. It dyes tannin-mordanted cotton in the cold, giving blue shades, which soon become reddish. The fourth stage of the process—namely, the conversion of this blue coloring-matter into the symmetrical rhodamin—is accomplished by completely dissolving the blue coloring-matter in water and allowing the solution to stand for about twelve (12) hours or until the change to the red rhodamin dye is complete. To ascertain this, add sodium acetate to a test portion of the solution and extract with ether. If no blue dye can be so extracted, the change is complete. Precipitate the dye from its solution by adding dilute nitric acid until the color of the solution changes from red to bluish violet. Green shining crystals of a nitrate separate out. If the blue dye has been precipitated in its less soluble form of a nitrate, mix it with, say, one hundred (100) times its weight of boiling water and continue boiling until the desired change is complete, concentrate the solution, and allow to cool. Some of the red dye will crystallize out. A further quantity can be obtained as a crystallized nitrate by adding dilute nitric acid, as hereinbefore described. The new red rhodamin dye so obtained dissolves in water and alcohol, is insoluble in ether, benzene, toluene, and carbon-bi-sulfid. In concentrated sulfuric acid it dissolves with an orange-red color, and upon dilution with water this sulfuric-acid solution becomes a blue violet. The solutions in alcohol and water are bluish red. All these solutions possess a beautiful yellowish fluorescence. Upon addition of mineral acids to the aqueous or alcoholic solution the color becomes bluish violet, and a large excess of acid produces an orange-red color. The red aqueous solutions are not affected by carbonates of alkalies. It dyes wool, giving bright bluish-red shades, resembling rhodamin. On tannin-mordanted cotton it dyes a violet-red.

*Example II. The production of an unsymmetrical rhodamin from di-methyl and di-ethyl-meta-amido-phenol.*—This dye is prepared either from the condensation product from chloral hydrate and di-methyl-meta-amido-phenol by further treatment with di-ethyl-meta-amido-phenol or the condensation product from chloral hydrate and di-ethyl-meta-amido-phenol is further treated with di-methyl-meta-amido-phenol. Thus, for instance, mix together molecular proportions of chloral hydrate and di-methyl-meta-amido-phenol, grinding these bodies together. The mixture first liquefies and then becomes solid. The reaction is usually ended in half an hour. Then grind this product with one (1) molecular proportion of di-ethyl-meta-amido-phenol, and continue the treatment as described in the foregoing example, so as to produce the leuco base of the blue coloring-matter and finally the red rhodamin.

The condensation with chloral hydrate, hereinbefore described, can also be effected by the use of chloral itself, chloral alcoholates, and similar derivatives of chloral.

In all the reactions the conditions above described can be varied to a certain extent. Thus in the first stage benzene, toluene, amyl alcohol, and the like may be used as diluents or solvents for the reagents, and also in the second stage the reaction can be moderated by the use of suitable solvents or by the addition of indifferent bodies—such as common salt, sodium sulfate, sodium acetate—or of bodies which absorb hydrochloric acid— such as chalk, magnesia, zinc-oxid, and the like—or of mixtures of the above-named substances.

Having thus described my invention, what I desire to claim and secure by Letters Patent is—

1. The process for the production of an alkylated rhodamin dye which consists in treating a chloral body with alkylated-meta-amido-phenol, substantially as described.

2. The process for the production of a symmetrical tetra-alkylated red rhodamin dye, by causing one (1) molecular proportion of a chloral body as hereinbefore defined to act upon one (1) molecular proportion of a dialkylated-meta-amido-phenol, as hereinbefore defined, without the addition of heat, substantially as hereinbefore described, and acting upon this condensation product with one (1) molecular proportion of a dialkylated-meta-amido-phenol, which is the same as that used in the production of the condensation product by grinding them together and heating them by gradually raising the temperature from forty (40) degrees to seventy (70) degrees centigrade in twelve (12) hours, converting the leuco base thus resulting by oxidation into its blue coloring-matter, and the conversion of this blue coloring-matter into its corresponding red rhodamin dye, substantially as hereinbefore described.

3. The process for the production of a symmetrical tetra-alkylated rhodamin dye by acting upon one (1) molecular proportion of a chloral body, as hereinbefore defined, with two (2) or more molecular proportions of dialkyl-meta-amido-phenol by grinding these together and heating them by gradually and slowly raising the temperature from forty (40) degrees to seventy (70) degrees centigrade, converting the leuco base so obtained by oxidation into its blue coloring-matter, and the conversion of this blue coloring-matter into its corresponding red rhodamin dye, substantially as hereinbefore described.

4. As a new article of manufacture the red coloring-matter which can be obtained substantially as described, from a chloral body, and which is soluble in water and in alcohol with bluish-red color and red fluorescence, turning to bluish violet on addition of hydrochloric acid and orange red upon addition of a large excess thereof; it gives an orange-red color with concentrated sulfuric acid which turns to a blue violet upon dilution with water; it dyes wool with bluish-red shades, and tannin-mordanted cotton with violet-red shades, substantially as described.

In testimony whereof I have hereunto set my hand in the presence of two subscribing witnesses.

HEINRICH CARO.

Witnesses:
GUSTAV L. LICHTENBERGER,
BERNHARD C. HESSE.